(12) United States Patent
Tian et al.

(10) Patent No.: US 11,846,569 B2
(45) Date of Patent: Dec. 19, 2023

(54) UTILITY POLE INTEGRITY ASSESSMENT BY DISTRIBUTED ACOUSTIC SENSING AND MACHINE LEARNING

(71) Applicant: NEC Laboratories America, Inc., Princeton, NJ (US)

(72) Inventors: Yue Tian, Princeton, NJ (US); Sarper Ozharar, Princeton, NJ (US); Yangmin Ding, North Brunswick, NJ (US); Shaobo Han, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/715,002

(22) Filed: Apr. 6, 2022

(65) Prior Publication Data

US 2022/0326112 A1 Oct. 13, 2022

Related U.S. Application Data

(60) Provisional application No. 63/172,158, filed on Apr. 8, 2021.

(51) Int. Cl.
*G01M 7/08* (2006.01)
*G01H 9/00* (2006.01)
*G01D 5/353* (2006.01)

(52) U.S. Cl.
CPC .......... *G01M 7/08* (2013.01); *G01D 5/35361* (2013.01); *G01H 9/004* (2013.01)

(58) Field of Classification Search
None
See application file for complete search history.

(56) References Cited

U.S. PATENT DOCUMENTS

2020/0072814 A1* 3/2020 Bailey ................. G01M 5/0025
2020/0319017 A1* 10/2020 Tian ....................... G02B 6/483

* cited by examiner

*Primary Examiner* — Brandi N Hopkins
*Assistant Examiner* — Nigel H Plumb
(74) *Attorney, Agent, or Firm* — Joseph Kolodka

(57) ABSTRACT

A method of utility pole integrity assessment by distributed fiber optic sensing/distributed acoustic sensing (DFOS/DAS) employing existing telecommunications fiber optic cable as a sensor. The fiber optic cable is suspended aerially from a plurality of utility poles and a machine learning model is developed during training by mechanically exciting the utility poles. Once developed, and in sharp contrast to the prior art, the machine learning model—in conjunction with DFOS/DAS operation—determines an integrity assessment for a plurality of the utility poles aerially suspending the fiber optic cable from a mechanical impact of a single pole.

1 Claim, 5 Drawing Sheets

UTILITY POLE INTEGRITY ASSESSMENT BY DISTRIBUTED ACOUSTIC SENSING AND MACHINE LEARNING

CROSS REFERENCE TO RELATED APPLICATIONS

This application claims the benefit of U.S. Provisional Patent Application Ser. No. 63/172,158 filed 8 Apr. 2021 the entire contents of each is incorporated by reference as if set forth at length herein.

TECHNICAL FIELD

This disclosure relates generally to distributed fiber optic sensing (DFOS) systems methods and structures. More particularly, it describes systems and methods for utility pole integrity assessment by distributed acoustic sensing (DAS) and machine learning.

BACKGROUND

As those skilled in the art will readily appreciate, distributed fiber optic sensing systems and methods have shown to be of great utility an provide a range of useful services such as sensing various physical parameters including temperature, vibration, strain, etc., thereby enabling a new era of infrastructure monitoring.

Distributed acoustic sensing techniques measure strain changes (stretch or compression) of optical fiber cores, which are typically protected by outside jackets/sheathing and mounted/suspended on utility poles by fixture structures.

Utility pole integrity is critical for both utility infrastructure integrity and public safety. Currently, utility pole integrity inspection requires well-trained inspectors/staff to perform inspections in the field, including visual inspection, hammer test, digging around the pole and drilling into the pole for sampling. This inspection procedure is needed to be done on every pole individually. As such, it is quite labor intensive, time consuming, subjective, highly dependent on individual inspector experience and invasive to the pole structure.

SUMMARY

An advance in the art is made according to aspects of the present disclosure directed to systems and methods for performing utility pole integrity assessment by distributed acoustic sensing and machine learning.

According to aspects of the present disclosure and in sharp contrast to contemporary utility pole integrity assessment methods our inventive systems and methods utilize existing telecommunications fiber optic cable suspended or otherwise attached to utility poles as sensor media, remotely captures the vibrational signal of utility poles excited by controlled mechanical impacts, and analyzes the vibrational features to assesses the integrity condition of individual poles using a machine learning model. Operationally, a distributed acoustic sensing (DAS) interrogator is positioned in a central office (CO) and connected to one end of the telecommunications fiber optic cable (sensor fiber) positioned on utility poles to be tested. Accordingly, vibrational signals from every single point along the length of the sensor fiber can be captured continuously by the remote interrogator and logged by a server that may also be co-located with the interrogator in the central office. To perform utility pole inspections, a trained or untrained person is sent to initiate mechanical impacts, e.g. hammer knocks, on each individual utility pole. Vibrational signal(s) resulting from the impacts imparted onto the pole(s) are subsequently identified, captured, and used by a machine learning model running on the server—or other analysis circuits/equipment—for analysis, assessment, and reporting.

BRIEF DESCRIPTION OF THE DRAWING

A more complete understanding of the present disclosure may be realized by reference to the accompanying drawing in which.

Figure 1:
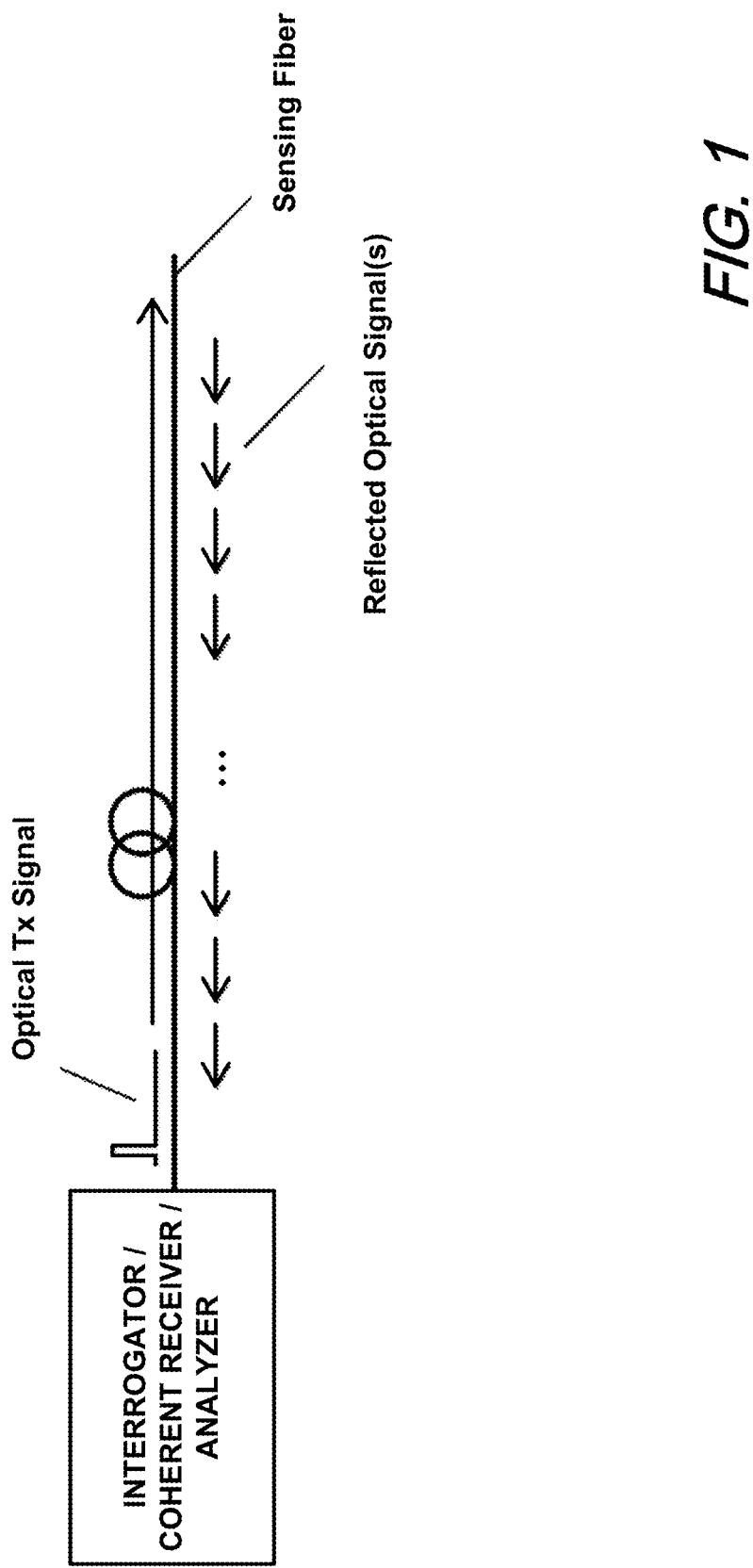
FIG. 1 is a schematic diagram of an illustrative prior art distributed fiber optic sensing system.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect optoelectronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Fiber optic sensing measures changes in "backscattering" of light occurring in an optical sensing fiber when the sensing fiber encounters vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

A schematic diagram illustrating the generalized arrangement and operation of a prior art distributed fiber optic sensing system is shown in FIG. 1. With reference to FIG. 1 one may observe an optical sensing fiber that in turn is connected to an interrogator. As is known, contemporary interrogators are systems that generate an input signal to the fiber and detects/analyzes reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes the interrogator that periodically generates optical pulses (or any coded signal) and injects them into an optical fiber. The injected optical pulse signal is conveyed along the optical fiber.

At locations along the length of the fiber, a small portion of signal is scattered/reflected and conveyed back to the interrogator. The scattered/reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Distributed Acoustic Sensing (DAS)/Distributed Vibrational Sensing (DVS) systems detect vibrations and capture acoustic energy along the length of optical sensing fiber. Advantageously, existing, traffic carrying fiber optic networks may be utilized and turned into a distributed acoustic sensor, capturing real-time data. Classification algorithms may be further used to detect and locate events such as leaks, cable faults, intrusion activities, or other abnormal events including both acoustic and/or vibrational.

Various DAS/DVS technologies are presently used with the most common being based on Coherent Optical Time Domain Reflectometry (C-OTDR). C-OTDR utilizes Rayleigh back-scattering, allowing acoustic frequency signals to be detected over long distances. An interrogator sends a coherent laser pulse along the length of an optical sensor fiber (cable). Scattering sites within the fiber cause the fiber to act as a distributed interferometer with a gauge length like that of the pulse length (e.g. 10 meters). Acoustic disturbance acting on the sensor fiber generates microscopic elongation or compression of the fiber (micro-strain), which causes a change in the phase relation and/or amplitude of the light pulses traversing therein.

Before a next laser pulse is be transmitted, a previous pulse must have had time to travel the full length of the sensing fiber and for its scattering/reflections to return. Hence the maximum pulse rate is determined by the length of the fiber. Therefore, acoustic signals can be measured that vary at frequencies up to the Nyquist frequency, which is typically half of the pulse rate. As higher frequencies are attenuated very quickly, most of the relevant ones to detect and classify events are in the lower of the 2 kHz range.

As noted, distributed acoustic sensing (DAS) techniques measure strain changes (stretch or compression) of optical sensor fiber cores, which are typically included as part of a larger cable assembly—protected by an outside jacket and mounted/suspended on utility poles by fixture structures. Integrity assessment or structure health monitoring of the utility poles can be conducted based on a response signal of a manual excitation (hammer or frequency sweep) performed on the pole.

According to aspects of the present disclosure, DAS is used to collect vibrational signal from individual poles remotely and store the data in a central office (CO), such that all data analysis and assessment is performed in a CO instead of in the field. Additionally, machine learning model(s) are employed to analyze vibrational features of utility poles so as to assess their integrity conditions. Thus, any in-field work is significantly simplified/reduced to just performing a few instant mechanical impacts on each pole—for example—mechanically knocking the pole a few times with a hammer. Furthermore, such simple in-field work does not require much training nor experience or skill, so it lowers training costs for inspection personnel. As a result, pole inspection is more efficient, less costly, and more objective by employing systems and methods according to aspects of the present disclosure.

Figure 2A:
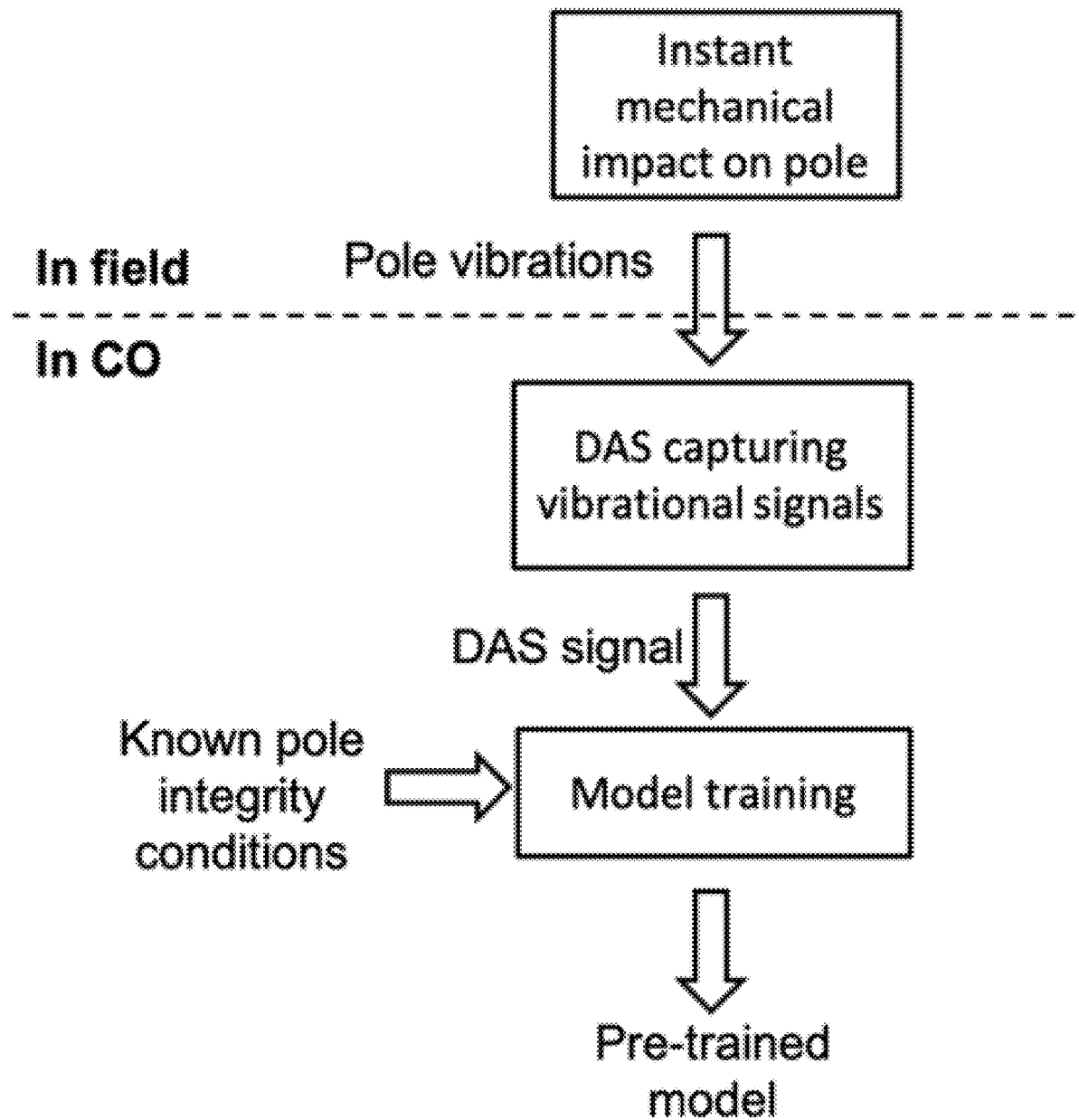
FIG. 2(A) is a schematic diagram illustrating model training according to aspects of the present disclosure.
Figure 2B:
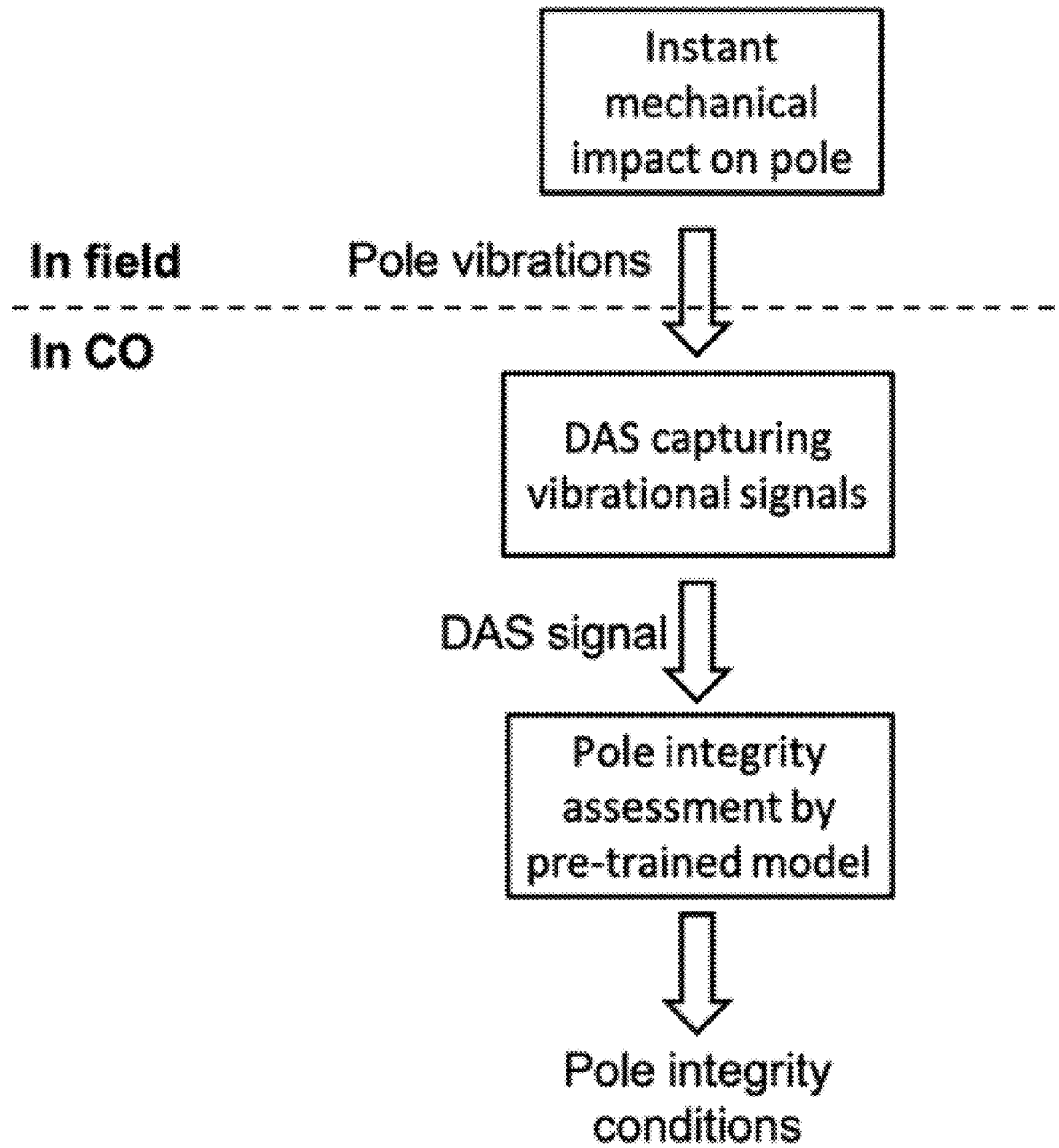
FIG. 2(B) is a schematic diagram illustrating pole integrity assessment according to aspects of the present disclosure.
Figure 3:
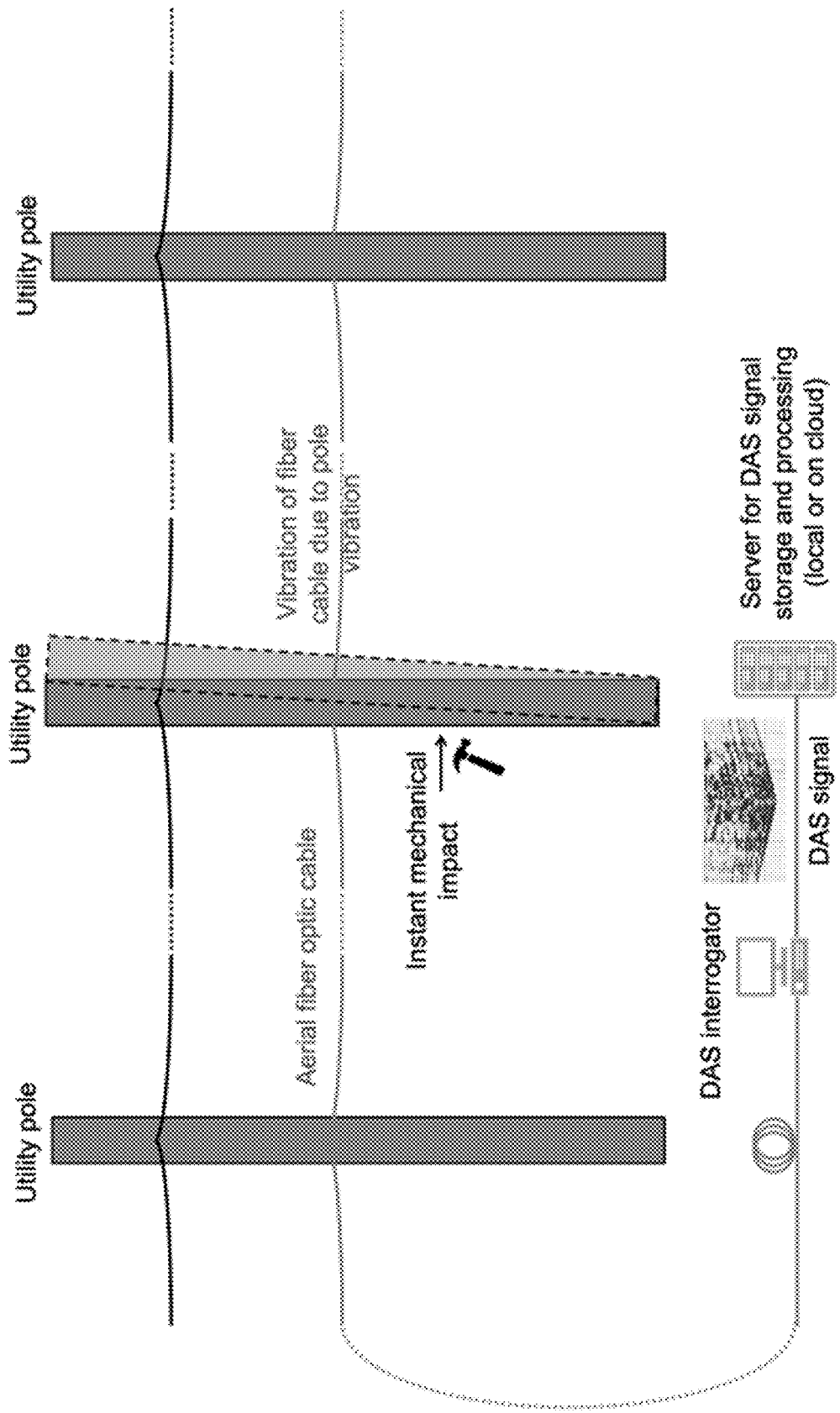
FIG. 3 is a schematic diagram illustrating elements for and assessment of utility pole integrity assessment according to aspects of the present disclosure.

To assess pole integrity, a DAS interrogator located inside a CO is optically connected to one end of an optical fiber sensor cable and configured to continuously monitor strain changes occurring along the length of the optical fiber sensor cable. An instant mechanical impact, such as a hammer knock, is imposed on the target pole. Since the fiber optic sensor cable is mounted/suspended/fixed onto the pole (or sufficiently proximate), the pole vibration due to the mechanical impact also vibrates the fiber optic sensor cable and creates strain changes in the fiber optic sensor cable, which are detected as DAS signals and stored in a server that may be located in the CO—or available via network. The activity of creating a mechanical impact and recording corresponding vibrational signal(s) can be repeated a few times on each pole. Finally, the stored DAS signals are used for machine learning model training or pole integrity assessment. For model training, the DAS signals from target poles together with their known integrity conditions are used to train a machine learning model. In pole integrity assessment, the DAS signals of target poles are input into the pre-trained machine learning model, and the model produces outputs indicative of one or more pole integrity conditions. This process can be repeated by multiple times to increase assessment accuracy. One single DAS interrogator can be used to capture vibrational signals from all poles attached to the optical fiber cable. And the DAS signal capture can be done on multiple poles simultaneously FIG. 2(A) is a schematic diagram illustrating model training according to aspects of the present disclosure; FIG. 2(B) is a schematic diagram illustrating pole integrity assessment according to aspects of the present disclosure; and FIG. 3 is a schematic diagram illustrating elements for and assessment of utility pole integrity assessment according to aspects of the present disclosure.

With simultaneous references to these figures, one can observe the implementation scheme as follows.

Optically connect the DAS interrogator to one end of the optical fiber sensor cable, to detect the optical fiber sensor cable vibrations as DAS signals. Impose an instant mechanical impact, such as hammer knock, onto a target pole at any position or direction as illustrated in FIG. 3. As a result, the pole is instantly vibrated, and thus the suspended/aerial fiber optic sensor cable on the pole (or underground sensor cable sufficiently proximate to the pole) is vibrated as well. This optical fiber sensor cable vibration is detected by the DAS interrogator and subsequently recorded as DAS signal. Oftentimes, one must repeat this step multiple times on each pole for sufficient model training or pole integrity assessment.

To train a model for pole integrity assessment, DAS signal collection in step 2 is carried out on multiple poles with known integrity conditions. DAS signals from these poles and their integrity conditions are used to train the machine learning model for pole integrity condition classification. This step results in a pre-trained model for pole integrity assessment and only needs to be done once for the same fiber cable.

Once the model is trained, DAS signals from any test pole(s) located along the fiber optic sensor cable route can be fed into the model. This trained (pre-trained) model is used to classify the DAS signals into different pole integrity condition classes. Thus, the test poles' integrity conditions are determined/obtained. If the pre-trained model is ready and does not need an update, a further training step can be skipped.

Figure 4:
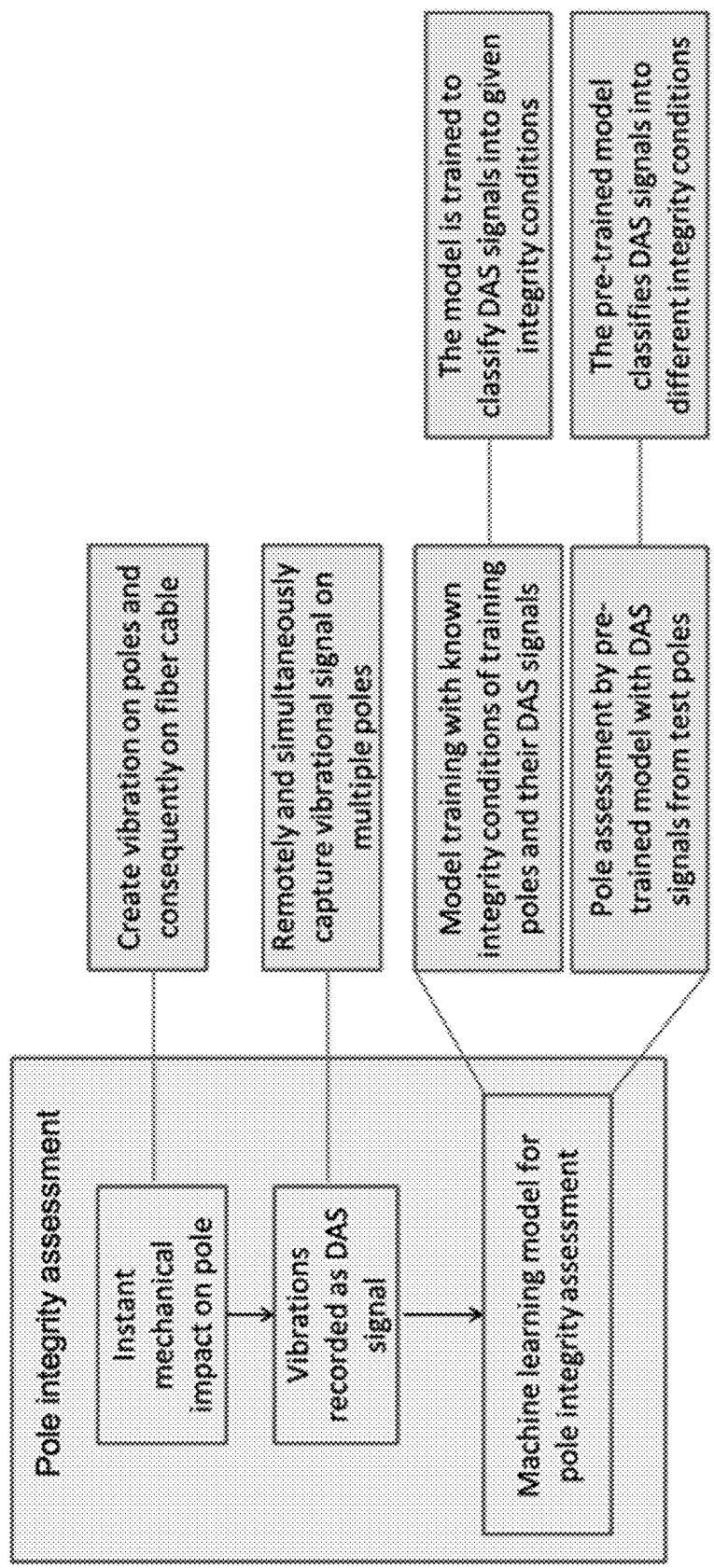
FIG. 4 is a schematic diagram illustrating an overview of illustrative operations according to aspects of the present disclosure.

FIG. 4 is a schematic diagram illustrating an overview of illustrative operations according to aspects of the present disclosure.

As may be observed from this figure, the present disclosure provides a system and method to assess utility poles' integrity, by using existing telecom fiber optic cable as a sensor cable, instant mechanical impact on the poles, DAS technology and a machine learning model. An instant mechanical impact creates a vibration event on the optical fiber cable mounted/suspended on a target pole, which is detected/recorded by DAS. By applying a designed machine learning model on the DAS signals, the target pole's integrity condition is obtained.

At this point, while we have presented this disclosure using some specific examples, those skilled in the art will recognize that our teachings are not so limited. Accordingly, this disclosure should be only limited by the scope of the claims attached hereto.

The invention claimed is:

1. A method for operating a utility pole integrity assessment system including a distributed a distributed fiber optic sensing/distributed acoustic sensing (DFOS/DAS) system having a length of optical sensing fiber suspended from a plurality of utility poles and in optical communication with a DFOS/DAS interrogator/analyzer, said method comprising:

operating the DFOS/DAS system while mechanically impacting/exciting individual ones of the plurality of utility poles, each of the impacted/excited utility poles having known integrity conditions to obtain DFOS/DAS response signals of the excited utility poles having known integrity conditions;

training a neural network model with the DFOS/DAS response signals of the excited utility poles having known integrity conditions such that DFOS/DAS signals are classified into the known integrity conditions;

operating the DFOS/DAS system while mechanically impacting/exciting one of the plurality of utility poles, the impacted/excited utility pole having unknown integrity conditions and collecting DFOS/DAS response signals of the plurality of utility poles having unknown integrity conditions;

classifying, using the trained neural network model, the DFOS/DAS response signals of the plurality of utility poles having unknown integrity conditions to known integrity conditions; and generating a report of the known integrity conditions of the plurality of utility poles classified.

* * * * *